United States Patent Office 3,840,507
Patented Oct. 8, 1974

3,840,507
POLYMER RECOVERY PROCESS
George Bagby, Epsom, and Alan Charles Sturt, Guildford, England, assignors to BP Chemicals International Limited, London, England
No Drawing. Filed May 17, 1972, Ser. No. 253,961
Claims priority, application Great Britain, May 25, 1971, 16,820/71
Int. Cl. C08f 1/88
U.S. Cl. 260—87.5 R         8 Claims

ABSTRACT OF THE DISCLOSURE

The invention relates to a process for the recovery of vinyl chloride polymer from aqueous emulsion by causing the dispersed polymer particles to form larger dispersed agglomerates, and either before, during or after agglomeration adding 1 to 20% polymer weight of vinyl chloride to the polymer particles. This addition is performed at a temperature below 30° C. and the resultant polymer has paste forming properties.

---

The present invention relates to a process for the recovery of polymers. It particularly relates to a process for the recovery of paste-forming vinyl chloride polymers. Throughout this specification by the term "vinyl chloride polymer" is meant polyvinyl chloride and copolymers of vinyl chloride containing up to 25% by weight of copolymerisable monomeric material.

Paste-forming vinyl chloride polymers are well known. they are derived from vinyl chloride emulsion polymers. Such polymers are capable of being mixed with plasticisers to form smooth, free flowing pastes which can be spread, moulded and finally formed into fabricated solid products by heating. Such polymers are characterised by a relatively low plasticiser absorption (plasticiser demand).

One process commercially employed for the production of paste-forming vinyl chloride polymers consists in producing the polymer in the form of an aqueous emulsion and isolating the polymer by a process which involves the evaporation of the aqueous phase, e.g. by spray drying. This evaporation step adds considerably to the cost of the product.

U.S. Pat. 2,550,996 shows a technique for isolating emulsion polymers by coagulating a latex by adding about 40% vinyl chloride and then evaporating off the vinyl chloride. This technique gives a very high plasticiser demand compared with the equivalent spray dried material.

An object of the present invention is to provide an improved technique for the isolation of paste-forming vinyl chloride polymers from aqueous emulsions thereof.

According to the present invention, the process for the recovery of a vinyl chloride polymer, as herein defined, from an aqueous emulsion thereof comprises causing the dispersed polymer particles to form relatively larger dispersed agglomerates, and either before, during or after agglomeation adding from 1 to 20% polymer weight of vinyl chloride monomer to the polymer particles at such a temperature below 30° C. that the recovered polymer has a plasticiser demand not greater than 10 g. dioctyl phthalate per 10 g. polymer and recovering the stabilised agglomerates.

An aqueous emulsion of a vinyl chloride polymer can be treated according to the process of the present invention. Paste-forming vinyl chloride polymers are formed as emulsion polymers by an emulsion polymerisation process, i.e. a process in which the monomer and the resultant polymer is in the form of fine droplets or particles which have been stabilised by means of emulsifying agents to such an extent that they are stable and remain dispersed throughout the aqueous phase in the absence of mechanical agitation. The process of the present invention can be applied particularly usefully to the isolation of such emulsion polymers.

The polymer particles in the aqueous emulsion of the vinyl chloride polymer may be caused to agglomerate by altering the conditions prevailing in the dispersions. E.g. in appropriate cases, dilution of the dispersion with water or a high degree of agitation in the system may cause the agglomeration to take place. However, the agglomeration is preferably aided by chemically reducing the efficiency of the emulsifying agent used to stabilise the emulsion. This may be done, for example, by adding acids or multivalent ions, e.g. calcium or aluminium ions, to the system. In one embodiment of the process of the present invention, the polymer dispersion is an aqueous polymer emulsion in which the emulsifying agent is the salt of a carboxylic acid, which acid is not an effective emulsifying agent under the conditions prevailing. In this embodiment the formation of the agglomerates may be aided by the addition of a relatively strong acid such as acetic acid of phosphoric acid to the system. Examples of suitable carboxylic acid salt emulsifying agents are the carboxylic acid soaps, e.g. the alkali metal or ammonium salts of lauric acid, stearic acid, palmitic acid and myristic acid. The agglomeration of the dispersed polymer particles can be facilitated by adding the vinyl chloride before the agglomeration occurs. In this case care must be taken to avoid too great an increase in viscosity during the agglomeration step. However, it can be added during the agglomeration step or after this step has been completed.

Most suitably, the vinyl chloride is added to the dispersion of the vinyl chloride polymer in an aqueous phase while it is being mechanically stirred. The time for which the polymer particles absorb the vinyl chloride can be varied considerably depending on the power of the polymer to absorb the vinyl chloride, the quantity of vinyl chloride agent used and the temperature at which the absorption takes place. It is believed that provided at least 1% wt. on polymer of vinyl chloride is present, the emulsion polymer particles will cohereand form stabilised agglomerates. The stabilised agglomerates have sufficient stability to be isolated as such without breaking down into the original small sized particles. It will be appreciated that the stabilised agglomerates can be easily separated from the aqueous phase by, for example, simple filtration or centrifuging techniques that cannot be applied successfully to the unstabilised agglomerates.

If less than 5% wt. vinyl chloride is present, there is a tendency for the agglomerates to form a thick cream. These creams can be separated from the aqueous phase by centrifuging but they are less easy to handle than the free flowing powder which is generally produced when more vinyl chloride is used. Plasticiser demand increases with increased quantities of vinyl chloride and poorer paste properties result. Accordingly it is preferred to employ from 5–15% vinyl chloride.

The temperature at which the absorption occurs is important in achieving a low plasticiser demand. Temperatures greater than 30° C. tend to give high plasticiser demand and thus it is essential to use temperatures below 30° C., and in general as low as possible. However, the use of temperatures below 0° C. gives rise to complications, such as the use of antifreeze agents in the emulsion which it is convenient to avoid.

For the best results it is preferred to use temperatures in the range 0° C. to 25° C. and the above preferred levels of vinyl chloride. These conditions give products comparable to the corresponding spray dried polymer.

The vinyl chloride may be added to the aqueous emulsion of the vinyl chloride polymer or it may be present in the polymerisation system if the agglomeration step is carried out before the polymerisation reaction, by which the polymer is formed, has reached completion.

It may be necessary to control the degree of agitation in the aqueous dispersion to ensure that the polymer remains in a dispersed state during the agglomeration step and this may be done by mechanical stirring or by high speed pumping of the aqueous dispersion.

The vinyl chloride is allowed to evaporate either before or after the stabilised agglomerate has been separated from the aqueous phase. Alternatively, it may be removed during the separation step. It is generally convenient to allow most of it to evaporate before the polymer is separated from the aqueous phase.

The process of the present inventon provides paste-forming vinyl chloride polymer as stabilised agglomerates that are easily recovered, e.g. by filtering or centrifuging and may be dried and processed as required. In general they have a particle size in the range 4 to 400 microns.

The following examples illustrate the process of the present invention. In examples 1 and 2 and 5–13, the PVC latex employed had a particle size in the range 0.05 to 0.3 microns and had been prepared by the emulsion polymerisation of vinyl chloride using ammonium stearate as the emulsifying agent. When spray dried this latex had a plasticiser demand of about 6 g./10 g. rosin.

The plasticiser demand is measured by taking 10 g. polymer, and adding weighed amounts of dioctyl phthalate incrementally until no more is absorbed and a paste is formed.

EXAMPLE 1

Overall Charge

| | G. |
|---|---|
| Vinyl chloride | 35.0 |
| PVC polymer latex (34.5% solids) | 1,100 |
| Distilled water | 2,050 |

Procedure

The distilled water and latex were poured into a 1 gallon stainless steel reactor. The reactor was purged with nitrogen and evacuated. The vinyl chloride was sucked into the reactor. The mixture was stirred at 700 r.p.m. for 6 hours at room temperature, during which period agglomeration of the polyvinyl chloride and absorption of the vinyl chloride took place. The vinyl chloride was then vented off and the product was separated in a basket centrifuge and washed in the centrifuge. The residue was dried in a vacuum oven at 45° C. for 48 hours. Microscopic examination indicated particle sizes in the range 20–100$\mu$. The Plasticiser demand was 6 g./10 g. resin.

EXAMPLE 2

A resin was made with the following recipe:

| | | |
|---|---|---|
| Vinyl chloride | g | 35.0 |
| PVC later (34.5% solids) | g | 1,100 |
| Distilled water | g | 2,050 |
| Acetic acid (10% w./w.) | ml | 50 |

The distilled water and latex were charged to a 1 gallon stainless steel reactor. The reactor was purged with nitrogen and evacuated. The vinyl chloride was sucked into the reactor. The mixture was stirred at 120 r.p.m. for 20 minutes during the last 10 minutes of which the acetic acid was pumped in. The stirrer speed was increased to 700 r.p.m. and the charge stirred for 6 hours at room temperature. At the end of this period the vinyl chloride was vented to atmosphere. The product was separated by filtration and dried. Microscopic examination indicated the sizes of the agglomerates were in the range 50 to 200$\mu$.

EXAMPLE 3

An emulsion polymerisation of vinyl chloride was carried out to 96.5% conversion according to a standard recipe which gives a latex particle size of up to 0.2 micron in diameter. At this point the latex was cooled back and calcium chloride solution added with stirring to give a slurry which, after venting off monomer, centrifuged to give a powder.

This after drying took up 8 g. plastic is (DOP) per 10 g. PVC. The recipe and procedure are given below:

Recipe and Procedure

| | | |
|---|---|---|
| Vinyl chloride | g | 1,000 |
| Empicol LXV (Sodium lauryl sulphate) | g | 10 |
| Lauryl alcohol | g | 17.5 |
| Ammonium persulphate | g | 2.5 |
| Soft water | ml | 2,000 |
| EDTA | g | 0.5 |
| Calcium chloride (20% aq: soln.) | ml | 125 |

Charge persulphate, lauryl alcohol, EDTA, and 1,500 ml. water. Close down. Purge and evacuate three times. Run in vinyl chloride. Heat to 50° C., stirring at 300 r.p.m. Pump in Empicol/500 ml. water over 5 hours. At pressure drop to 45 p.s.i. (96.5% conversion), cool to 25° C. Pump in calcium chloride solution. Stir for 1 hour at 300 r.p.m. Vent off, remove contents.

An emulsion polymerisation of vinyl chloride was carried out to 91% conversion using a seed latex, to give a bimodal latex particle size distribution, the ranges being 0.2–0.4 and 0.95–1.05 mm. in diameter. The latex was then cooled back and agglomerated by addition of calcium chloride to give a product which centrifuged to give a powder which, on drying, had a plasticiser demand of 6 g. DOP/10 g. PVC. The recipe and procedure are as given below:

Recipe and Procedure

| | |
|---|---|
| Seed PVC latex (40.9% T.S.) | 305 g. |
| Vinyl chloride | 1,400 ml. (1,280 g.) |
| Lauryl alcohol | 22.4 g. |
| Ammonium persulphate | 3.2 g. |
| EDTA | 0.64 g. |
| Soft water | 1,600 ml. |
| Empicol LVX (Sodium lauryl sulphate) | 5 g. |
| Calcium chloride (10% aqueous solution) | 320 ml. |

Charge seed latex, lauryl alcohol, persulphate, EDTA, and 1,100 mm. water. Close down. Purge and evacuate 3 times. Heat to 50° C., stirring at 300 r.p.m. Pump in vinyl chloride over 5 hours and Empicol/500 ml. water over 5 hours. When pressure drops to 60 p.s.i., cool to 25° C. Pump in calcium chloride. Stir at 300 r.p.m. for thirty minutes. Switch off stirrer, vent off, remove contents.

EXAMPLE 4

An emulsion polymerisation of vinyl chloride was carried out to 93% conversion to give a latex of particle size 0.2 microns. The product was cooled, and agglomerated by adding calcium chloride solution to give a product which, after venting off, centrifuged to give a powder which on drying had a plasticiser demand of 8.5 g. DOP/10 g. PVC. The recipe and procedure are given below (a).

A similar polymerisation was carried out using an identical recipe as described above, and at 93% conversion was cooled, vented off, and removed from the reactor. It was later agglomerated by addition of 7 parts of vinyl chloride per hundred of polymer, followed by the calcium chloride solution, to give a slightly gritty powder which centrifuged easily to give a powder which, after drying, had a plasticiser demand of 9 g. DOP/10 g. PVC. The recipe and procedure are given below (b).

Recipe and Procedure (a)

(a) Polymerisation stage

| Reagent | Parts | Amount |
|---|---|---|
| 1. Vinyl chloride | 100 | 1,280 |
| 2. Empicol LXV | 1 | [1] 12.8 |
| 3. Lauryl alcohol | 1.75 | 22.4 |
| 4. Stearyl alcohol | 0.25 | 3.2 |
| 5. Ammonium persulphate | 0.25 | 3.2 |
| 6. Soft water | 125 | [2] 1,600 |

[1] 0.8 g. direct; 12.g. proportioned.
[2] Milliliters.

Charge reagents 3–5, 0.8 g. Empicol and 1,100 ml. water. Close down. Purge and evacuate 3 times. Run in vinyl chloride. Heat to 50° C., with stirring (300 r.p.m. twin propellers). 1 hour later, pump in 12 g. Empicol/500 ml. water over 4 hours. Run to 93% conversion.

(b) Agglomeration

1. Cool to 25° C. Pump in 160 ml. of aqueous calcium chloride, stirring at 300 r.p.m.
2. Stir for 1 hour.
3. Vent off, empty contents.

Recipe and Procedure (b)

Latex from (a) (41.7% T.S.) _____g__ 2,600
Vinyl chloride _____g__ 180
Calcium chloride (20% aq. soln.) _____ml__ 135

Charge latex from (a). Close down. Purge and evacuate twice. Run in vinyl chloride, stirring at 300 r.p.m. Heat to 25° C. Pump in calcium chloride over ca. 10 minutes. Stir for 1 hour. Vent off, and remove contents.

EXAMPLES 5–13

A further series of Examples 5–13 was carried out.

Two general methods of carrying out the preparation were used, one in which the agglomerating agent was added before the monomer, and one in which it was added afterwards. These are described below:

Method A

The distilled water and latex were poured into a 1 gallon stainless steel reactor. The reactor was purged with nitrogen. The mixture was stirred at 200 r.p.m. for 20 minutes, during the last 10 minutes of which the agglomerating agent solution was pumped in. The reactor was evacuated and then the vinyl chloride was sucked in. The mixture was stirred at the desired temperature for the desired time. After this period, the charge was cooled, if necessary, and the vinyl chloride was vented off. The product was separated from the aqueous phase by basket centrifuge and washed with water in the centrifuge. The resin was dried in a vacuum oven at 45° C. for 48 hours.

Method B

The distilled water and latex were charged into a 1 gallon stainless steel reactor. The reactor was purged with nitrogen and evacuated. The vinyl chloride was sucked into the reactor. The mixture was stirred at 200 r.p.m. for 20 minutes, during the last 10 minutes of which the agglomerating agent solution was pumped in. The stirrer speed was then increased to the required level and the charge stirred at the required temperature for the required time. After this period, the charge was cooled, if necessary, and the vinyl chloride was vented off. The product was separated from the aqueous phase by basket centrifuge and washed with water in the centrifuge. The resin was dried in a vacuum oven at 45° C. for 48 hours.

EXAMPLE 5

A series of 16 preparations were carried out by Method A. The following variations of conditions were used:

Time of stirring _____ 1 hour or 6 hours.
Temperature _____ 20° or 60° C.
Solids content _____ 11% or 23%.
PVC latex/monomer ratio ____ 75/25 or 95/5.

The latex was diluted with distilled water and dilute acetic acid (10% w./v.) was added as agglomerating agent.

Enough acid was added to reduce the pH to 5.0. The latex was charged into the reactor and the rest of the procedure was as in Method A with stirring rate at 700 r.p.m.

The results of plasticiser demand tests are shown in Table 1. There is clearly a synergistic effect of low temperature and low monomer level. The other variables had insignificant effects.

TABLE 1

[Plasticiser demand of polymers of Example 5–g. of dioctyl phthalate—average of four results]

| Temperature (° C.) | Ratio of PVC to VC monomer | |
|---|---|---|
| | 75/25 | 95/5 |
| 20 | 15.5 | 6.5 |
| 60 | 18.0 | 14.5 |

EXAMPLE 6

Example 6 shows that a shorter time, a lower stirrer speed and a different order of addition can be used. The recipe was as follows:

Vinyl chloride _____g__ 40
PVC latex (28.5% solid) _____g__ 2,660
Distilled water _____g__ 270
Acetic acid (10%) _____ml__ 150

Method B was used for the preparation. The stirrer speed was 400 r.p.m. and the time of stirring was only 10 minutes at 20° C.

The plasticiser demand of the dried product was 6 g. DOP/10 g. polymer.

EXAMPLE 7

A polymer was made with the following recipe using Method A.

Vinyl chloride _____g__ 40
PVC latex (28.6% solids) _____g__ 2,660
Distilled water _____g__ 270
Calcium chloride (10% aq.) _____ml__ 190

The stirrer speed was 400 r.p.m. The batch was stirred for 1 hour at 20° C.

The product had a plasticiser demand of 6 g. DOP/10 g. polymer.

EXAMPLE 8

A polymer was made with the same recipe as in Example 7 using Method A except that 160 ml. of 10% aq. barium chloride was used as agglomerating agent in place of calcium chloride. The stirrer speed was 700 r.p.m. The batch was stirred for 10 minutes at 20° C.

The product had a plasticiser demand of 6 g. DOP/10 g. polymer.

EXAMPLE 9

A polymer was made with the same recipe as in Example 7, using Method A except that 160 ml. of lead acetate solution (10% aq.) was used as agglomerating agent in place of calcium chloride. The stirrer speed was 700 r.p.m. The batch was stirred at 20° C. for 10 minutes.

The product had a plasticiser demand of 6 g. DOP/10 g. polymer.

EXAMPLE 10

A polymer was made with the same recipe as in Example 7, except that Method B was used. The stirrer speed was 400 r.p.m. and the batch was stirred at 20° C. for 10 minutes.

The product had a plasticiser demand of 6 g. DOP/10 g. polymer.

EXAMPLE 11

A polymer was prepared according to Method A with the following recipe.

| | | |
|---|---|---|
| Vinyl chloride | g | 13 |
| PVC latex (31.6% solids) | g | 800 |
| Distilled water | g | 2,400 |
| Acetic acid (10%) | ml | 416 |

The emulsifiers in the latex were ammonium myristate and ammonium palmitate.

The stirrer speed was 700 r.p.m. The charge was stirred at 20° C. for 10 minutes.

The plasticiser demand of the dry polymer was 10 g. of DOP/10 g. of polymer.

EXAMPLE 12

A polymer was prepared according to Method A with the following recipe.

| | | |
|---|---|---|
| Vinyl chloride | g | 25 |
| PVC latex (25% solids) | g | 1,800 |
| Distilled water | g | 1,400 |
| Acetic acid (10%) | ml | 173 |

The emulsifier in the latex was potassium laurate.

The stirrer speed was 700 r.p.m. The charge was stirred at 20° C. for 10 minutes.

The plasticiser demand was 8 g. of DOP/10 g. of polymer.

EXAMPLE 13

A resin was made according to the following recipe:

| | | |
|---|---|---|
| Vinyl chloride | g | 1,000 |
| Distilled water | g | 2,480 |
| Potassium persulphate | g | 2 |
| Lauric acid | g | 10 |
| Potassium hydroxide | g | 3.6 |
| Glacial acetic acid | ml | 40 |

The potassium persulphate, 1,600 g. of distilled water, 1 g. of lauric acid, and 0.4 g. of potassium hydroxide were charged into a stainless steel reactor. The reactor was sealed, purged with nitrogen and evacuated. 100 g. of vinyl chloride was then sucked into the reactor. The charge was stirred at 300 r.p.m. and heated at 50° C. for 7 hours. During the first six hours the remaining vinyl chloride, and the remaining potassium hydroxide and lauric acid dissolved in 480 g. of distilled water were pumped into the reactor at constant rates.

After 7 hours at 50° C., the conversion had reached 90% and the charge was cooled to 20° C. when the stirrer speed was increased to 700 r.p.m. The glacial acetic acid was quickly pumped into the reactor and the charge stirred for a further 10 minutes. The reactor was then vented to atmosphere.

The product was separated from the aqueous phase by basket centrifuge, and a clear filtrate was obtained. The product was washed with distilled water in the centrifuge. The resin was dried in a vacuum oven at 55° C.

The yield was 850 g.

The plasticiser demand of the dry resin was 6 g. of DOP/10 g. of resin.

We claim:

1. A process for the recovery of homopolymers or copolymers of vinyl chloride, having not more than 25% wt. of comonomer from an aqueous emulsion thereof which comprises the steps of:

(1) forming relatively larger dispersed agglomerates from the emulsion
   (2) either before, during or after agglomeration adding from 1 to 20% polymer weight of vinyl chloride to the polymer particles at a temperature below 30° C., and
   (3) subsequently recovering the vinyl chloride homopolymer or copolymer agglomerates having a plasticiser demand not greater than 10 g. dioctyl phthalate per 10 g. polymer.

2. A process according to claim 1 where the agglomeration of the dispersed polymer particles is aided by chemically reducing the efficiency of the emulsifying agent used to stabilise the emulsion.

3. A process according to claim 1 where the emulsifying agent is the salt of a carboxylic acid which acid is not itself an effective emulsifying agent under the conditions prevailing.

4. A process according to claim 3 where the efficiency of the emulsifying agent is reduced by the addition of a relatively strong acid.

5. A process according to claim 1 where the vinyl chloride is added before the formation of agglomerates.

6. A process according to claim 1 where from 5 to 15% polymer weight of vinyl chloride is added.

7. A process according to claim 1 where the vinyl chloride is added to the polymer at a temperature in the range 0 to 25° C.

8. A process according to claim 1 where vinyl chloride is allowed to evaporate before the agglomerates have been separated from the aqueous phase.

References Cited
UNITED STATES PATENTS

| | | | |
|---|---|---|---|
| 3,725,375 | 4/1973 | Sturt | 260—92.8 W |
| 2,550,996 | 5/1951 | Halbig | 260—92.8 |
| 3,624,051 | 11/1971 | Baur et al. | 260—78.5 |
| 2,674,593 | 4/1954 | Condo et al. | 260—92.8 |

JOSEPH L. SCHOFER, Primary Examiner

J. KIGHT, Assistant Examiner

U.S. Cl. X.R.

260—29.6 PT, 31.8 R, G, 92.8 W, 96 R, 92.8 A